(12) United States Patent
Bochiechio

(10) Patent No.: US 8,286,689 B1
(45) Date of Patent: Oct. 16, 2012

(54) POROUS CERAMIC BODY AND METHOD THERFOR

(75) Inventor: Mario P. Bochiechio, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/220,807

(22) Filed: Aug. 30, 2011

(51) Int. Cl.
*B22C 9/10* (2006.01)
*B22C 1/00* (2006.01)

(52) U.S. Cl. ............ 164/28; 164/525; 164/528

(58) Field of Classification Search ........ 164/28, 164/520–529; 264/43, 44, 610; 106/38.2–38.9
See application file for complete search history.

(56) References Cited

U.S. PATENT DOCUMENTS

| | | | |
|---|---|---|---|
| 4,164,424 A | 8/1979 | Klug et al. | |
| 4,187,266 A | 2/1980 | Greskovich et al. | |
| 4,191,721 A | 3/1980 | Pasco et al. | |
| 4,246,215 A | 1/1981 | Pasco et al. | |
| 4,837,187 A * | 6/1989 | Frank et al. | 501/127 |
| 5,332,023 A | 7/1994 | Mills | |
| 5,977,007 A | 11/1999 | Lassow et al. | |
| 6,494,250 B1 * | 12/2002 | Frank et al. | 164/529 |
| 7,348,286 B2 * | 3/2008 | Yoshimura et al. | 501/99 |
| 2006/0054057 A1 | 3/2006 | Doles et al. | |
| 2008/0226489 A1 * | 9/2008 | Sakata et al. | 419/38 |

* cited by examiner

*Primary Examiner* — Kuang Lin
*Assistant Examiner* — Kevin E Yoon
(74) *Attorney, Agent, or Firm* — Carlson, Gaskey & Olds PC

(57) ABSTRACT

A method of forming a porous ceramic body includes providing a moldable material that includes a ceramic material, a binder material and a filler material comprising carbon nanotubes. The moldable material is then formed into a desired shape of a green ceramic body. The green ceramic body is then thermally treated to remove the binder material and the carbon nanotubes. The thermally treated green ceramic body is then sintered to form the porous ceramic body with elongated nanopores.

11 Claims, 2 Drawing Sheets

POROUS CERAMIC BODY AND METHOD THERFOR

BACKGROUND

This disclosure relates to improvements in ceramic material processing and investment casting.

Investment casting is known and used to cast metallic parts of relatively complex geometry. For example, turbine engine components such as blades, vanes, and blade outer air seals that have internal passages or cavities are formed by an investment casting process that utilizes a ceramic core. In the investment casting process, a metallic alloy is cast around the ceramic core to form the internal passages or cavity of the component. The ceramic core is later removed, leaving the internal passages or cavities.

SUMMARY

Disclosed is a method of forming a porous ceramic body. The method includes providing a moldable material that includes a mixture of a ceramic material, a binder material and a filler material comprising carbon nanotubes. The moldable material is then formed into a desired shape of a green ceramic body. The green ceramic body is then thermally treated to remove the binder material and the carbon nanotubes. The thermally treated green ceramic body is then sintered to form the porous ceramic body. The removal of the carbon nanotubes leaves the ceramic body with nanopores.

Also disclosed is a method of investment casting using the porous ceramic body as an investment casting core. The method includes casting a liquid metallic material around the porous ceramic body. The metallic material is then solidified around the porous ceramic body.

Also disclosed is a porous ceramic body that includes a ceramic body that defines an internal porosity. The internal porosity has elongated nanopores that extend substantially linearly along respective axes.

The various features and advantages of the disclosed examples will become apparent to those skilled in the art from the following detailed description. The drawings that accompany the detailed description can be briefly described as follows.

DETAILED DESCRIPTION

Figure 1:
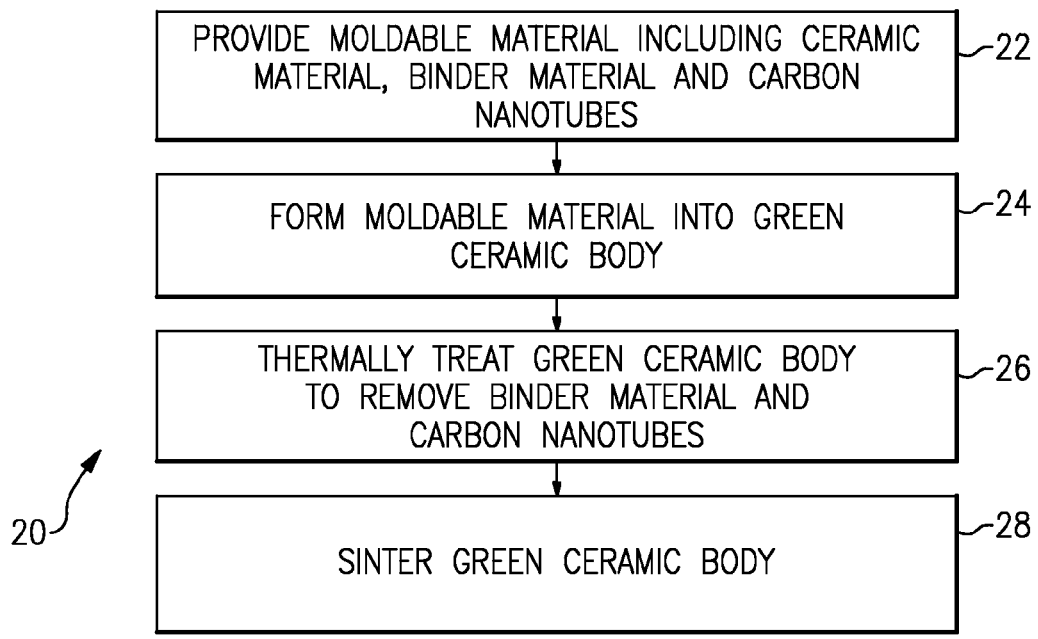
FIG. 1 illustrates an example method of forming a porous ceramic body.

FIG. 1 illustrates an example method 20 of forming a porous ceramic body, such as a ceramic investment casting core. As will be described, the exemplary ceramic body and method 20 improve the investment casting process by reducing damage to the cast component that can occur during the casting process. It is to be understood, however, that although the method 20 and examples herein are described with regard to investment casting and investment casting processes, the ceramic body and method 20 also has uses outside of investment casting, such as for fabricating non-sacrificial, porous ceramic structures.

In the illustrated example, the method 20 generally includes steps 22, 24, 26 and 28, although it is to be understood that each of the steps 22, 24, 26, and 28 can, in practice, include one or more sub-steps in order to carry out or facilitate the primary steps. In the example shown, step 22 includes the action of providing a moldable material that includes a ceramic material, a binder material, and a filler material. The filler material includes carbon nanotubes. In a further example, the moldable material includes only the ceramic material, the binder material and the carbon nanotubes.

The ceramic material is of a composition that is desired for the end use porous ceramic body. For instance, the ceramic material contains at least one of alumina, silica, and an aluminosilicate. In another example, the ceramic material includes silica, zircon, and an aluminosilicate. In a third example the ceramic material includes zirconia or partially or fully stabilized zirconia that includes at least one stabilizer selected from: sodium oxide ($Na_2O$), potassium oxide ($K_2O$), calcia (CaO), magnesia (MgO) or yttria ($Y_2O_3$) or members of the aluminosilicate family such as kyanite, sillimimanite, and mullite. The ceramic material may be provided as a powder that is mixed with the binder material and the filler material.

The binder material is an organic material that serves to bind together the ceramic material and the filler material. In that regard, the binder material includes a polymer material, a wax material or combinations thereof. The polymer material in one example is a thermoplastic or a thermoset polymer. In another example, the binder material is or includes a wax material, and the wax material is a paraffin wax. Given this description, one of ordinary skill in the art will be able to determine the amount of the selected binder material that is suitable for binding together the ceramic material and the filler material into a moldable material. In some examples, the binder material is present in the moldable material in an amount no greater than approximately 18 weight percent.

The carbon nanotubes are comprised of graphene material and have either a tube structure, a solid rod structure or both. The carbon nanotubes are single wall nanotubes and/or multiwall carbon nanotubes. In general, the carbon nanotubes are elongated tubes or rods that have a lateral nanoscale dimension. As an example, the carbon nanotubes have a lateral nanoscale dimension that is equal to or less than 500 nanometers (0.000019 inches). In a further example, the lateral nanoscale dimension is equal to or less than 100 nanometers (0.0000039 inches). The average length of the carbon nanotubes is generally greater than the nanoscale lateral dimension. In some examples, the average length of the nanotubes is from several micrometers up to millimeter scale length.

The amount of the carbon nanotubes in the moldable material controls the porosity, and hence the strength and crushability, of the end use porous ceramic body or investment casting core. In one example, the moldable material includes 0.5-25 weight percent of the carbon nanotubes. In a further example, the moldable material includes 5-15 weight percent of the carbon nanotubes. The weight percentage of carbon nanotubes in the moldable material is approximately equivalent to the final porosity in the porous ceramic body.

After step 22, at step 24, the moldable material is formed into a green ceramic body having a desired shape. For instance, for an investment casting core, the green ceramic body is molded into a shape to form the internal passage or cavity features of an investment cast component. The term "green" refers to the moldable material prior to sintering. For example, the forming of the moldable material includes heating and pouring or injecting the moldable material into a die cavity to form the desired shape.

After forming the green ceramic body, step 26 includes the action of thermally treating the green ceramic body to remove the binder material and the carbon nanotubes. In one example, the thermal treatment is conducted in an oxygen-containing environment, such as air, to remove the binder material and the carbon nanotubes.

In one example, the thermal treatment includes gradually increasing the temperature of the green ceramic body to a desired final temperature. For instance, the heating profile of the thermal treatment includes heating the green ceramic body to one or more intermediate temperatures and holding at the one or more temperatures for a period of time to remove the binder material and the carbon nanotubes. The binder material volatilizes at a lower temperature than the carbon nanotubes. Thus, the thermal treatment in one example includes heating to and holding at a first temperature to remove the binder material, followed by heating to and holding at a second, higher temperature to remove the carbon nanotubes. In general, the carbon nanotubes volatilize at a temperature of approximately 900° F. (482° C.) or greater. The temperature may be held at the first temperature, the second temperature, or each of the first and second temperatures for a suitable amount of time to completely remove the binder material and the carbon nanotube from the green ceramic body.

The green ceramic body, now devoid of the binder material and the carbon nanotubes, is then sintered at step 28 to form the end use porous ceramic body. In one example, the sintering is conducted in combination with the thermal treatment of step 26 such that after the thermal treatment process, the temperature is raised from the second temperature to a third, higher temperature for sintering. For example, the sintering temperature depends on the selected ceramic material.

The use of the carbon nanotubes in the method 20 strengthens the green ceramic body during the thermal treatment process. For instance, as the binder is removed from the green ceramic body, the ceramic body is generally weakened from the resultant porosity that the binder material leaves behind. However, the carbon nanotubes reinforce the green ceramic body to thereby provide dimensional stability and resistance to the green ceramic body collapsing on itself during thermal treatment. Additionally, the carbon nanotubes also leave behind an internal porosity in the porous ceramic body that, as will be described below, provides for efficient removal of the porous ceramic body when used as a ceramic investment casting core during an investment casting process. In one embodiment, the removal of the carbon nanotubes results in elongated nanopores within the porous ceramic body that can be infiltrated by a caustic solution during the core removal process.

Figure 2A:
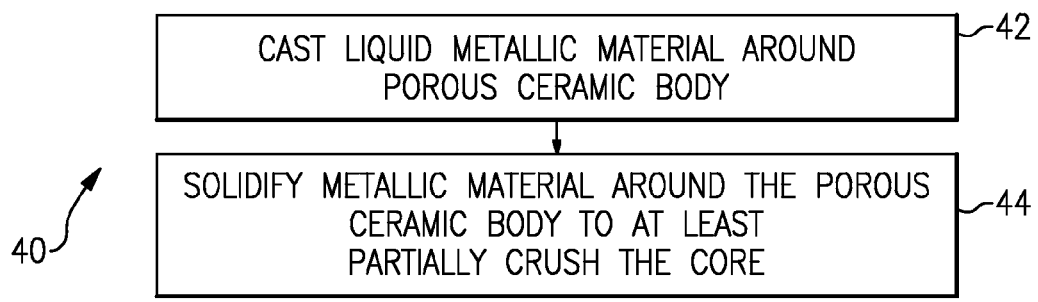
FIG. 2A illustrates an example method of investment casting.
Figure 2B:
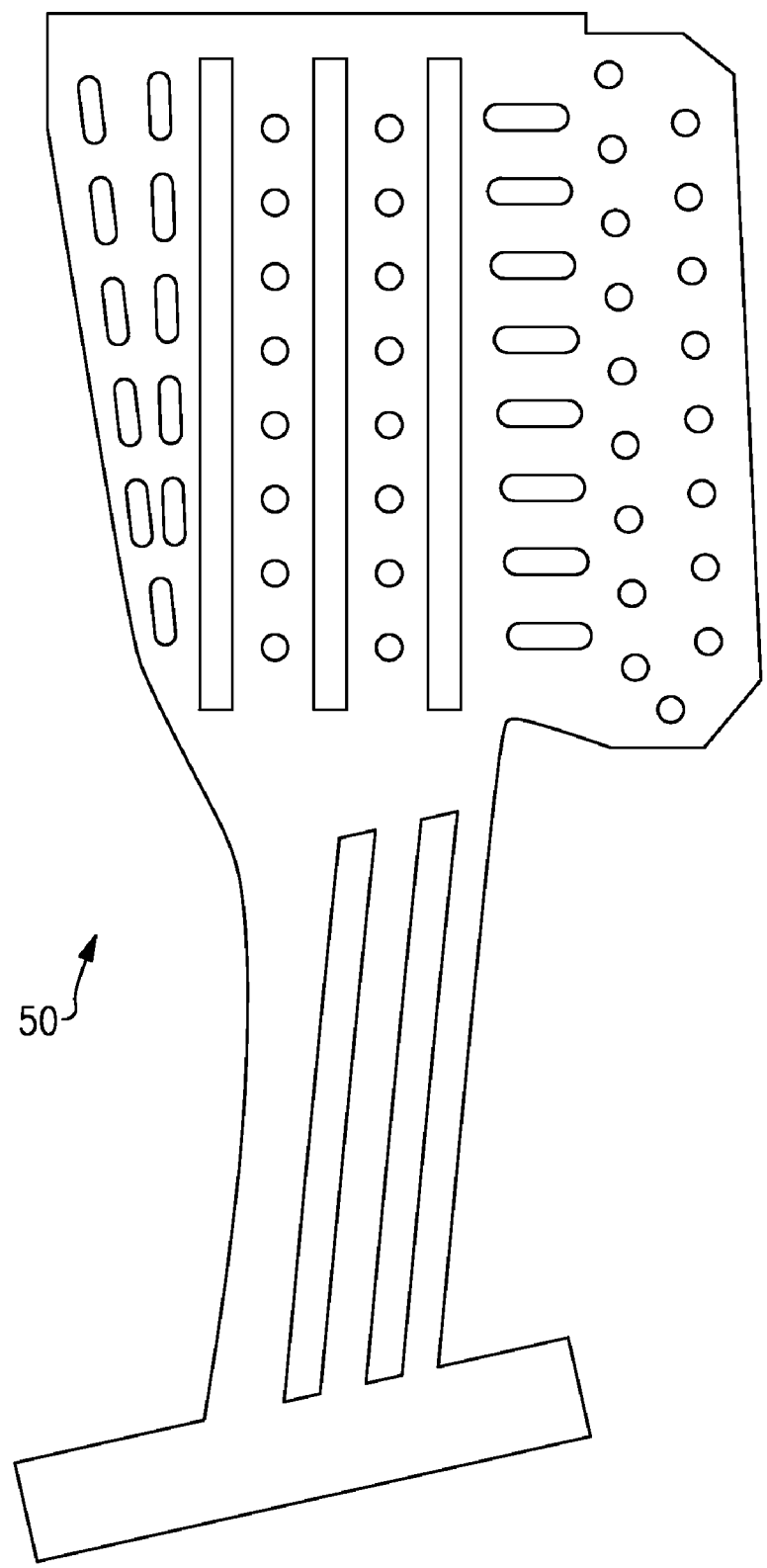
FIG. 2B illustrates an example investment casting core.

FIG. 2A illustrates an example method 40 of investment casting. The method 40 utilizes the porous ceramic body from method 20 as a ceramic investment casting core. An example investment casting core 50, fabricated according to method 20, for a turbine engine airfoil is shown in FIG. 2B. In the illustrated example, the method 40 includes steps 42 and 44. It is to be understood that additional steps may be used with method 40 and that each of the steps 42 and 40 may include sub-steps.

As shown, step 42 includes the action of casting a liquid metal material around the porous ceramic body. The liquid metallic material is then solidified at step 44 around the porous ceramic body. The solidification results in the metallic material contracting and exerting a contraction force on the porous ceramic body. The porous ceramic body has sufficient porosity to be at least partially crushed under the contraction force. That is, as described above with regard to method 20, the porous ceramic body has an internal porosity that remains from the removal of the carbon nanotubes. The internal porosity functions to weaken the porous ceramic body such that the contraction force at least partially crushes the ceramic body. For instance, fractures may form in the ceramic body due to the force. The fractures and crushing of the ceramic body allow the solidifying metallic material to contract, with less resistance from the core than if the core did not crush at all or had less "crushability." Therefore, the cast metallic material is less likely to tear or fracture during the solidification process, which is one factor that may cause an investment cast component to be scrapped or reworked. Thus, the porous ceramic investment casting core facilitates the reduction of scrap/rework in an investment casting process.

After the solidification of the metallic material around the porous ceramic investment casting core, the core is removed from the solidified metallic material. In one example, the removal process includes infiltrating the internal porosity of the core with a caustic solution. The caustic solution is introduced into the nanopores by exposing the core to the caustic solution by a liquid based autoclave process and/or a molten salt bath. As discussed above, the internal porosity in the core is approximately 0.5-25 volume percent, and in a further example is approximately 5-15 volume percent. The internal porosity includes open porosity that is interconnected with the environment around the core and closed porosity that is not connected with the surrounding environment of the core. However, during the autoclave process, as the ceramic material of the core breaks down, any closed porosity becomes open and thereby exposed to the caustic solution. Additionally, simple geometries may be removed through impact with an abrasive media, high pressure water, or a combination therein.

Figure 3:
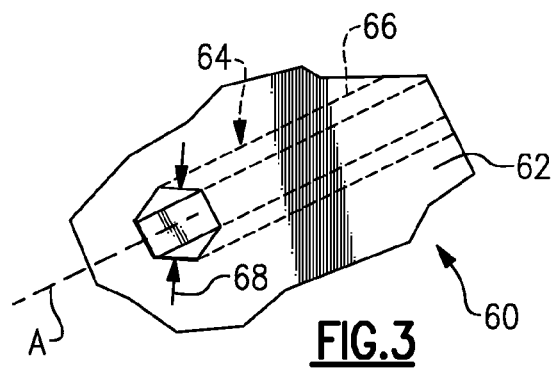
FIG. 3 shows an example porous ceramic body.

FIG. 3 illustrates a portion of an example porous ceramic body 60, as generally described above. For instance, the porous ceramic body 60 includes at least one of alumina, silica, and an aluminosilicate. In another example, the porous ceramic body 60 silica, zircon, and an aluminosilicate. In a third example the porous ceramic body 60 includes zirconia or partially or fully stabilized zirconia containing at least one stabilizer selected from: sodium oxide ($Na_2O$), potassium oxide ($K_2O$), calcia (CaO), magnesia (MgO) or yttria ($Y_2O_3$) or members of the aluminosilicate family such as kyanite, sillimimanite, and mullite. In a further example, the porous ceramic body 60 includes a combination of the above example materials, and in another example includes only a single one of the example material such that the porous ceramic body 60 is monolithic.

In this example, the porous ceramic body 60 includes a ceramic body 62 defining an internal porosity 64 that has an elongated nanopore 66 that extends substantially linearly along an axis A. The nanopore 66 is generally elongated along axis A and includes a lateral nanoscale dimension 68, as described above. In the illustration, only one of the elongated nanopores 66 is shown, although it is to be understood that the internal porosity 64 includes a plurality of such nanopores 66.

In the illustrated example, the nanopore 66 is a vestige of a removed carbon nanotube, as also described above. The shape of the nanopore 66 corresponds to the shape of the carbon nanotube that was removed. In this example, the nanopore 66 has a hexagonal cross-sectional shape, similar to the carbon nanotube that was removed. In other examples, the cross-sectional shape of the nanopore 66 does not fully retain the shape of the carbon nanotube and the sides become altered during the processing such that the cross-sectional shape is quasi-hexagonal, ovular or circular.

In one example, the porous ceramic body 60 has an internal porosity of approximately 0.5-25 of volume percent, which depends upon the amount of carbon nanotubes used in the process to form the porous ceramic body 60. In a further example, the internal porosity is 5-15 volume percent.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of forming a porous ceramic body, the method comprising:
   providing a moldable material including a mixture of a ceramic material, a binder material and a filler material comprising carbon nanotubes;
   forming the moldable material into a desired shape of a green ceramic body;
   thermally treating the green ceramic body to remove the binder material and the carbon nanotubes; and
   sintering the thermally treated green ceramic body to form a porous ceramic body having nanopores.

2. The method as recited in claim 1, wherein the nanopores include elongated nanopores.

3. The method as recited in claim 1, wherein the ceramic material includes at least one of alumina, silica or aluminosilicate.

4. The method as recited in claim 1, wherein the ceramic material includes at least one of zirconia or mullite.

5. The method as recited in claim 1, wherein the forming of the moldable material includes injection molding.

6. The method as recited in claim 1, wherein the thermal treating of the green ceramic body includes removing the binder material at a first temperature, and removing the carbon nanotubes at a second, higher temperature.

7. The method as recited in claim 6, wherein the sintering of the green ceramic body includes sintering at a third temperature that is higher than the second temperature.

8. The method as recited in claim 1, wherein the moldable material includes 0.5-25 weight percent of the carbon nanotubes.

9. The method as recited in claim 1, wherein the moldable material includes 5-15 weight percent of the carbon nanotubes.

10. The method as recited in claim 1, wherein the sintered porous ceramic body includes a porosity of approximately 0.5-25 volume percent.

11. The method as recited in claim 1, wherein the thermal treating of the green ceramic body to remove the binder material includes heating in an oxygen-containing environment.

* * * * *